June 18, 1940. K. BRENKERT 2,204,884
FILM GATE
Filed Jan. 21, 1939 2 Sheets-Sheet 1
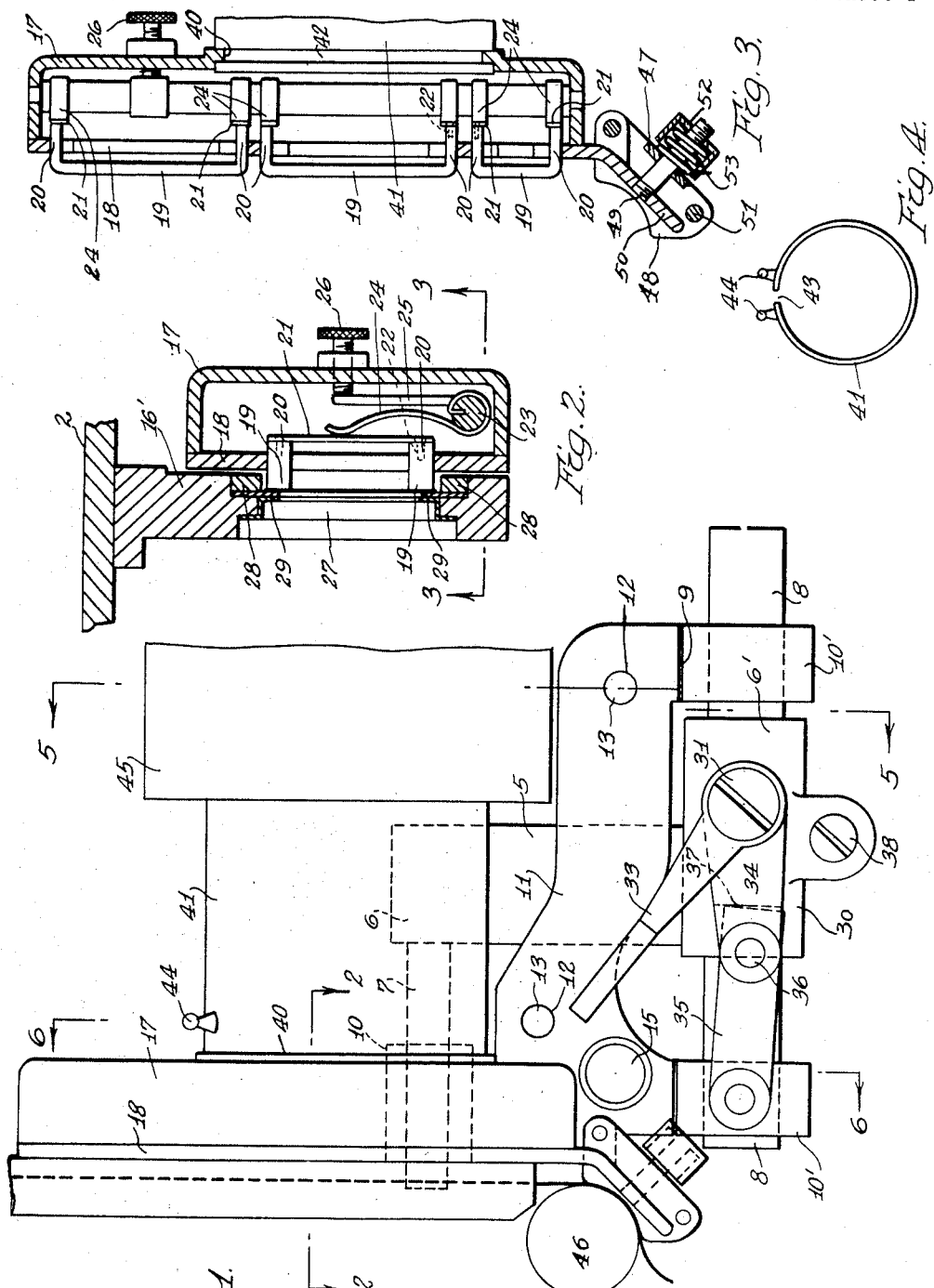
INVENTOR.
Karl Brenkert
BY Samuel Wiseman
ATTORNEY.

June 18, 1940.   K. BRENKERT   2,204,884
FILM GATE
Filed Jan. 21, 1939   2 Sheets-Sheet 2

INVENTOR.
Karl Brenkert
BY Samuel Weisman
ATTORNEY.

Patented June 18, 1940

2,204,884

UNITED STATES PATENT OFFICE 2,204,884

FILM GATE

Karl Brenkert, Detroit, Mich., assignor to Brenkert Light Projection Company, Detroit, Mich., a corporation of Michigan Application January 21, 1939, Serial No. 252,149

4 Claims. (Cl. 88—17)

The present invention pertains to a novel film gate structure for a motion picture projector. One of the objects of the invention is to provide an improved means for moving the gate relatively to the aperture plate.

To permit the necessary movement of the gate for threading the film, a gate hinged to a fixed part of the machine is more commonly used. The hinged gate, however, presents certain objections in construction and operation. A horizontally slidable gate has been proposed, with springs normally holding the gate in closed position. This construction is also objectionable in that the springs must be resisted in opening the gate and slam the gate against the film and aperture plate, with a detrimental effect, when released. The proposed sliding gate also involves problems in the matter of support and construction, all of which are considerably simplified by the present invention. In general, the present invention provides an improved and simplified sliding gate firmly supported by the main housing structure, independently of the aperture plate, and locked without the use of the springs.

Another object of the invention is the provision of novel pads in the gate with a common means for adjusting the spring tension thereon. The separate pads are engaged by leaf springs anchored to a common rod journaled in the gate body. A single adjusting device is provided for adjusting the angular position of the rod against the tension of the springs and hence regulating the spring tension simultaneously on all of the pads.

The pads are provided in pairs at, above and below the film aperture, to hold the film flat before reaching and after leaving the aperture, to insure the desired flat condition at the aperture. Although the pads cover a substantial length of film, a thick splice in the film will not disturb the frame at the aperture until engaging the pads at opposite sides of the aperture, since the latter are separate from the pads above and below the aperture.

A further object of the invention is to provide a gate assembly that is easily removable from the projector housing. In this connection, the gate is mounted on a sliding carriage and is fastened thereto with only one screw. The screw is easily accessible and can be turned by hand to free the gate from the carriage.

The invention is fully disclosed by way of example in the following description and the accompanying drawings, in which:

Figure 1 is a side elevation of the gate assembly;

Figure 2 is a section on the line 2—2 of Figure 1;

Figure 3 is a vertical section on the line 3—3 of Figure 2;

Figure 4 is a detail end view of the lens tube;

Reference to these views will now be made by use of like characters that are employed to designate corresponding parts throughout.

Figure 6:
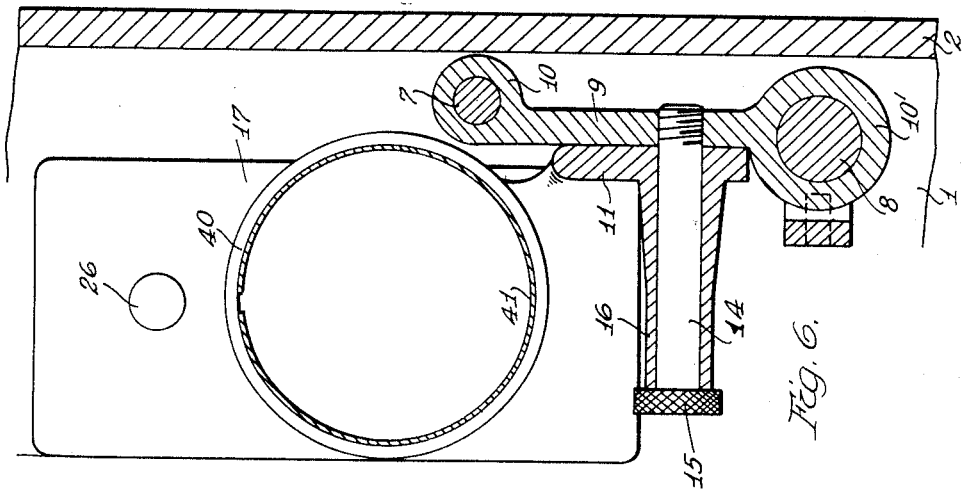
Figure 6 is a section on the line 6—6 of Figure 1.
Figure 5:
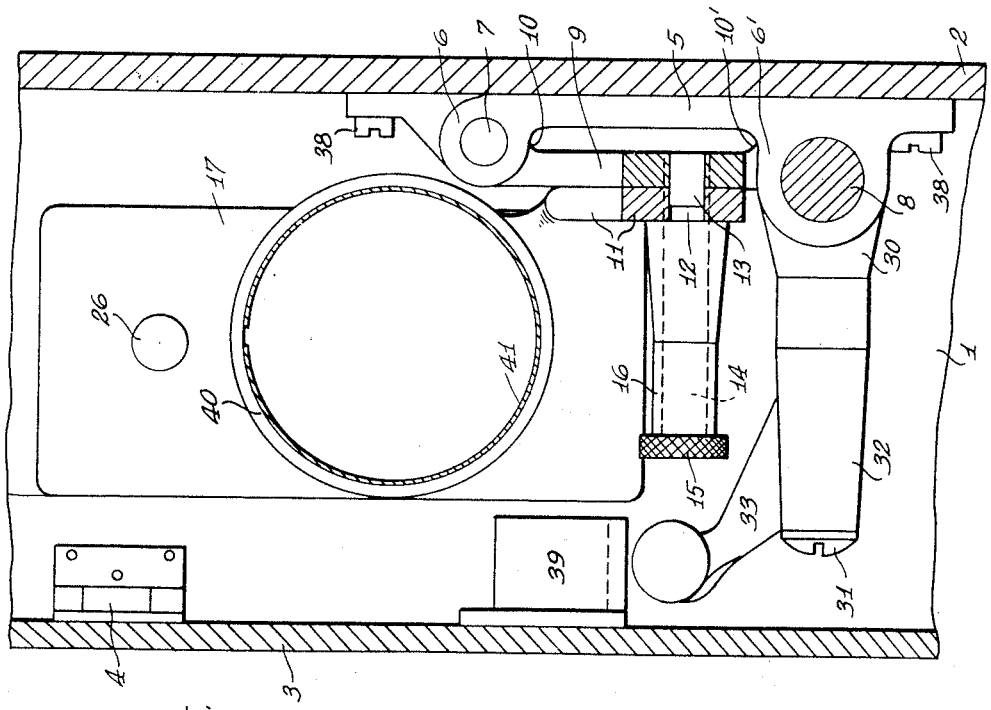
Figure 5 is a section on the line 5—5 of Figure 1.

In Figures 5 and 6 is shown one of the end walls 1 of a projector housing having a lengthwise vertical wall or partition 2 constituting the inner side wall of the film compartment and ordinarily dividing the interior of the housing 1 into a film compartment and a mechanism compartment. The outer side wall of the film compartment is constituted, at least in part, by a door section 3 hinged at 4 to the end wall 1.

To the partition 2 is secured a bracket 5 formed with bosses 6, 6' in which are secured upper and lower guide rods 7 and 8 mounted horizontally and suitably spaced from each other. On the rods 7 and 8 is slidably mounted a carriage 9 by means of bosses, 10, 10', the bosses 6, 6' on each rod being located to permit ample movement of the carriage with its bosses for the purpose set forth below. On the carriage is mounted a gate base 11 located by its apertures 12 receiving dowel pins 13 extending from the carriage 9, as shown more clearly in Figure 5. The base is secured to the carriage by a screw 14 threaded into the carriage and having a knurled head 15 bearing against the free end of a spacer sleeve 16 extending from the base. The screw and sleeve are of such length as to bring the head rather close to the door 3 for easy reach.

To the partition 2 is secured an aperture plate 16' in edgewise manner and perpendicular thereto in more or less the usual fashion. The gate base 1 carries a gate body 17 standing vertically and parallel to the aperture plate to cooperate in holding the film against the latter. The body 17 is a box-like structure having a detachable face wall 18 to enable assembly of other parts therein.

In the plate 18 are mounted a number of alined pads, each consisting of a pair of vertically disposed and horizontally spaced U-shaped members 19 having their legs 20 slidably mounted in the plate and their intermediate or main portions disposed outside the plate, as illustrated in Figure 3. The ends of each such pair, inside the base member, are joined vertically and horizontally by thin metal strips 21 suitably fastened to the ends, by means of screws 22.

A vertical rod 23 is rotatably mounted in the body 17 near one of its side walls and extends from top to bottom. Leaf springs 24 are wrapped around the rod, with one end anchored thereto and the other end engaging a horizontal strip 21 to exert an outward pressure on the pads. A fixed arm 25 extends from the rod 23 into the body 17 and has its free end engaged by a set screw 26 threaded in the back of the body, whereby the tension of the springs 24 against the pads may be adjusted.

The pads above and below the aperture are separate from these at the sides of the aperture. Thus, although the film is engaged by pads over a substantial length, a splice engaging any pair of pads will not affect the film over this entire length, but only at those pads engaged by the splice.

The aperture plate 16 has the usual film aperture 27 with vertical marginal guides 28 between which the film is adapted to run. Runways 29 are extended from the guides into the aperture and are engageable by the margins of the film when the latter is inserted between the guides. The U-shaped members of the film pads are so positioned laterally as to hold the film against the runways 29 by the adjusted tension of the springs 24, as shown in Figure 2.

A fulcrum block 30 is fixedly mounted with relation to the gate base 11 and may consist of an extension of the boss 6' which is an integral part of the bracket 5. A long screw 31 threaded into the fulcrum block has rotatably mounted thereon the hub 32 of a toggle operating lever 33. A link 34 extends rigidly from the hub approximately half way to one of the bosses 10' of the carriage 9. A link 35 joins the last named boss to the free end of the link 34 and is pivotally attached to both parts to complete the toggle which is operated by the lever 33.

Figure 1 illustrates the locked position of the gate against the aperture plate in one of the extreme positions of the toggle. The intermediate knuckle 36 of the toggle is below the line of centers of the end knuckles and the inner end of the link 35 extends into and bears against the bottom of a slot 37 in the link 34. Thus, the gate cannot back away from the aperture plate, unless the lever 33 is actuated, and consequently no springs are needed to hold the gate in its operative position. This construction obviously simplifies the device and reduces the cost and also eliminates the undesirable slamming of the gate against the film and aperture plate resulting from the use of gate springs.

The base and body of the gate are readily removed from the projector housing, when desired, by releasing the screws 15 and 31. The carriage 9 and bracket 5 may be removed by releasing the screws 38 which fasten the latter to the partition 2.

The inner surface of the door 3 carries a stop 39 which lies over the free end of the toggle operating lever 33 when the latter is in the locking position shown in Figures 1 and 5. The stop is constructed to strike against the lever when the latter is in release position, so that the door cannot be closed unless the gate is closed.

The back wall of the gate body 17 is formed with a flanged opening 40 to receive a split light tube 41 having one end grooved at 42 to receive the flange when inserted in the opening. At opposite sides of its split 43, the tube has finger pieces 44 by which it may be grasped to compress the tube for insertion or removal. The tube 41 is received telescopically in a light and lens tube 45 carried by the housing, so that the light beam is fully enclosed regardless of the movements of the gate.

At the lower end of the gate is a device for holding the film firmly against an adjacent roller or sprocket 46 (Figure 1). This device includes a back plate 47 at the ends of which are pairs of thin metal shoes 48. The back plate is supported by a screw 49 passed loosely therethrough and threaded into a lip 50 extending angularly and rearwardly from the lower end of the plate 18. The shoes of each pair engage the film at both sides of the rows of perforations therein for the sprocket teeth. The shoes are maintained in their proper spacing by spacer rods 51 passed through their ends, as shown in Figure 3.

The free end of the screw 49 carries a hollow nut 52 in which is seated a spring 53 bearing against the member 47. Through the spring, the shoes 48 hold the film under pressure against the member 46. The shoes are also capable of a universal movement, in response to variations in the thickness of the film, by reason of the loose mounting of the screw 49 in the plate 47. The pressure of the spring is adjusted by turning the nut 52 on its threads.

Although a specific embodiment of the invention has been illustrated and described, it will be understood that various alterations in the details of constructiton may be made without departing from the scope of the invention, as indicated by the appended claims.

What I claim is:

1. In a motion picture projector, a housing, an aperture plate supported therein, a gate slidably mounted relatively to said plate, a fulcrum support fixed relatively to said aperture plate, a toggle link fulcrumed on said support, and another link pivotally connected to the first link and to the movable gate structure, means for actuating the first link, the connection between the links being off the line of centers of the fulcrum axis and the connection of the second link to the gate structure when the gate is in closed position, and stop means at the first named connection limiting further movement of said connection in the same direction away from said line of centers.

2. In a motion picture projector, a housing, an aperture plate supported therein, a gate slidably mounted relatively to said plate, a toggle mechanism for sliding said gate and holding it in operative position against said plate, a lever for operating said toggle, a door for said housing, and a stop projecting from the inner surface of said door and engageable by said lever when in other than the gate-closing position.

3. In a motion picture projector, a housing, an aperture plate supported therein, a gate slidably mounted relatively to said plate, a fulcrum support fixed relatively to said aperture plate, a toggle link fulcrumed on said support, and another link pivotally connected to the first link and to the movable gate structure, means for actuating the first link, the connection between the links being off the line of centers of the fulcrum axis and the connection of the second link to the gate structure when the gate is in closed position.

4. In a motion picture projector, a housing, an aperture plate supported therein, a gate slidably mounted relatively to said plate, a fulcrum support fixed relatively to said aperture plate, a toggle link fulcrumed on said support, and another link pivotally connected to the first link and to the movable gate structure, means for actuating the first link, the connection between the links being off the line of centers of the fulcrum axis and the connection of the second link to the gate structure when the gate is in closed position, and means for limiting further movement of said connection in the same direction away from said line of centers.

KARL BRENKERT.